United States Patent

[11] 3,629,841

[72] Inventor Charles A. Hare
St. Paul, Minn.

[21] Appl. No. 39,337
[22] Filed May 21, 1970
[45] Patented Dec. 21, 1971
[73] Assignee Sperry Rand Corporation
New York, N.Y.

[54] VECTOR GENERATOR APPARATUS
2 Claims, 3 Drawing Figs.

[52] U.S. Cl. .......... 340/172.5, 340/324 A
[51] Int. Cl. .......... G06f 3/14, H01j 31/08
[50] Field of Search .......... 340/172.5, 324 A; 235/151

[56] References Cited

UNITED STATES PATENTS 3,500,332 3/1970 Vosbury .......... 340/172.5
3,509,542 4/1970 Earman .......... 340/172.5
3,320,409 5/1967 Larrowe .......... 235/151

*Primary Examiner*—Gareth D. Shaw
*Assistant Examiner*—Ronald F. Chapuran
*Attorneys*—Thomas J. Nikolai, Kenneth T. Grace and John P. Dority

ABSTRACT: A vector generator for use with a cathode-ray tube (CRT) display for forming line segments of a desired length and at a desired angle with respect to a reference. Digital signals from a computer or other source, representative of an incremental change in the coordinates in the line segment to be formed and of the slope of the segment are converted to analog signals and applied to summing amplifiers along with analog signals representative of an initial X and Y coordinate location of a point on the line segment to be formed. The output of the summing amplifiers are analog signals which are coupled to the CRT deflection electrodes such that when the beam is unblanked, the beam will trace a path from the point $(X_1, Y_1)$ to the point $(X_1+s\Delta Y_2)$, $(Y_1+\Delta Y_2($.

INVENTOR
CHARLES A. HARE
BY Thomas J. Nikolai
ATTORNEY

INVENTOR
CHARLES A. HARE

BY Thomas J. Nikolai
ATTORNEY

VECTOR GENERATOR APPARATUS

BACKGROUND OF THE INVENTION

In the Ehrman U.S. Pat. No. 3,509,542 which is assigned to the assignee of the present invention, there is described a CRT vector display which forms a line segment by summing up a series of incremental line segments of a uniform length and which are oriented at either 0°, 45° or 90° with respect to a predetermined reference. In many applications, a trace of a line segment formed in this manner is quite satisfactory. However, in other applications, objection may be taken to the fact that the incremental segments making up the vector zigzag about the desired path of the vector. For example, in high resolution displays, this zigzagging of the incremental components may make the display unacceptable.

The present invention provides a means for utilizing standard existing digital and analog circuit elements in the implementation of a vector generator. Further, the vector generator of this invention permits the drawing of a full screenline segment in a continuous manner rather than by discrete or incremental amounts. As a result, the line segment so formed is highly linear.

The apparatus of the present invention operates on the principle that a line segment may be expressed by the equation $y=sx+b$ where $x$ and $y$ are the coordinates of a point on the line and $s$ is the slope of the line segment with respect to a predetermined reference. The constant $b$ is the intercept of the line segment with the ordinate axis. In a case where the slope $s$ is less than 1 (the angle with respect to the reference is less than 45°) and the vector starts at the origin the implementation is quite simple. A computer or other source of digital input signals applies signals to a pair of holding registers, one of which temporarily stores the X coordinate of a line segment to be drawn and the other contains digital signals representing the slope of the vector. These digital signals are applied through a bit switching network to appropriate terminals of a digital to analog converter which, in the preferred embodiment takes the form of a resistive ladder network. The analog signal representative of the X coordinate of a point on the line is fed back and applied as a reference to the digital to analog converter associated with the slope-holding register. The output signals obtained from the digital to analog converters are amplified and applied to the deflection electrodes of the cathode ray tube. As a result, when the beam of the CRT is unblanked a path will be traced from the origin to a coordinate location, X, and $Y=sx$.

When drawing vectors having a slope greater than 1, certain additional circuitry is required. Specifically, the same circuits utilized in forming slopes which are less than 1 are connected through a suitable switching device to the input terminals of a first and a second summing amplifier. Applied to the other terminals of the summing amplifier are analog signals representative of the $X$ and $Y$ coordinates of an initial point on the line segment to be formed. The switching circuit, which is controlled by the computer or external source of input signals appropriately connects the output signals from the first and second digital to analog converters to the second input terminals of the summing amplifiers. As a result, the deflection signals produced at the output of the summing amplifiers cause the beam to move from a position $X_1$, $Y_1$ to a location $X_2=X_1+s\Delta Y_2$ and $Y_2$ and $Y_2=Y_1+\Delta Y_2$.

It is to be especially noted that the line segments formed on the face of the CRT are not comprised of individual incremental segments but are a continuous trace from an initial coordinate location to a desired final coordinate location.

Accordingly, it is a primary object of this invention to provide a novel vector generator for use with a cathode ray tube display.

Another object of this invention is to provide a novel vector generator which may be implemented with standard digital and analog circuits.

Still another object of this invention is to provide a new design for a vector generator which when used with a cathode-ray tube causes a line segment to be formed in a continuous manner.

These and other more detailed and specific objects will be disclosed in the course of the following specification, reference being had to the accompanying drawings, in which.

DESCRIPTION OF THE PREFERRED EMBODIMENT—FIG. 1

Figure 1:
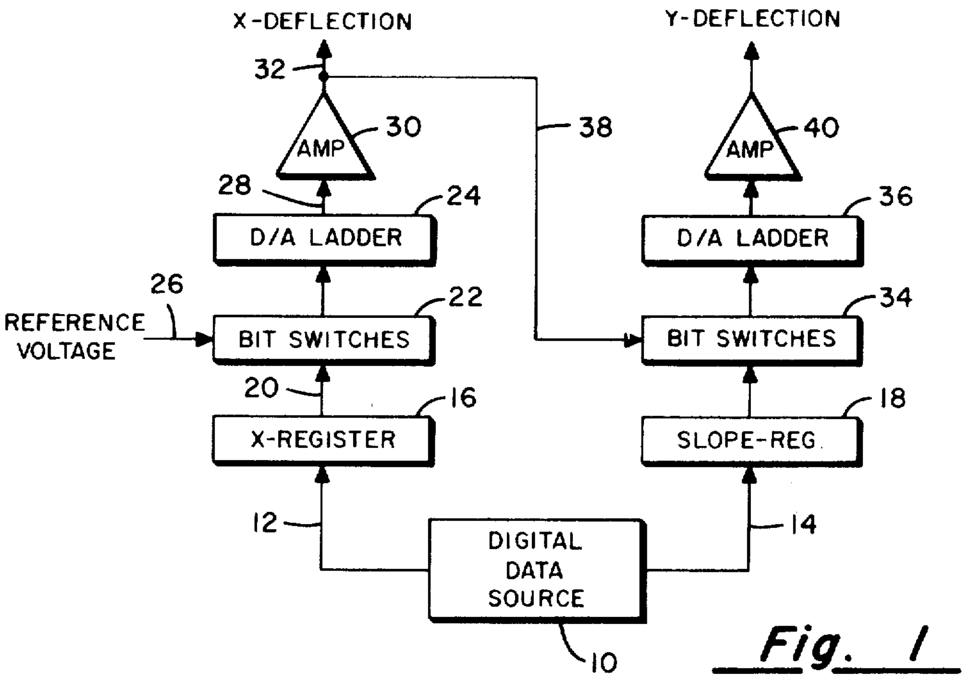
FIG. 1 is a block diagram of the preferred embodiment of this invention for producing line segments on the face of a cathode-ray tube having a slope, s, less than 1.

A block diagram of the implementation of the vector generator for forming vectors having a slope less than 1 is illustrated in FIG. 1. As is illustrated, there is a source of digital signals 10 which may be a computer, a keyboard, or other suitable device. The source 10 is coupled by means of cables 12 and 14 to a pair of digital signal registers 16 and 18. It is desirable that the information from the source 10 pass to the registers 16 and 18 in parallel form over a plurality of conductors in the cables 12 and 14. However, it is possible to load the registers 16 and 18 using serially transmitted signals and it is not intended to exclude this type of operation.

The register 16 is designated the X register. The signals from the source 10 passing through the X-register 16 are representative of the coordinate location of an initial or starting point on the line segment to be traced on the face of the cathode-ray tube. The register 18 is designated the slope-register for the reason that the digital signals applied to it over cable 14 are representative of the slope of the line segments to be formed. The digital signals stored in the X register are applied by way of the cable 20 to a series of bit switches 22. There is one such bit switch for each stage of the X register and it serves to connect its associated stage to one stage of the digital to analog converter ladder 24. Depending upon the contents of a particular stage in the register 16, either a reference voltage applied by way of line 26 or ground is applied to the corresponding stage of the ladder network 24.

The construction and mode of operation of a digital to analog ladder network is fully explained at pages 5–29 through 5–35 in a book entitled "Notes on Analog-Digital Conversion Techniques" prepared by staff members of the Servomechanisms Laboratory, Department of Electrical Engineering, Massachusetts Institute of Technology published in 1957. Hence all that need be said is that there will appear at the output 28 of D/A ladder 24 a voltage signal which is proportional to the binary number stored in the X-register 16. This analog output signal is amplified by amplifier 30 and the signal appearing at the output 32 from this amplifier is used to energize the X-deflection electrodes of the cathode-ray tube used in the system.

Another set of bit switches 34, substantially identical to switches 22, is associated with the individual stages of the slope register 18. Rather than connecting a reference voltage or a ground potential to corresponding terminals of the digital to analog ladder 36, the output from amplifiers 30 is connected by way of a conductor 38 to the bit switches 34. Hence, either ground or the X-deflection signal will be applied to the digital to analog ladder network 36. By applying the X-deflection signal to the stages of the ladder 36 determined by the contents of the slope register 18, the X-deflection signal is essentially attenuated by a value proportional to the "slope" of the line to be formed. Since, as was indicated earlier, the Y coordinate of the line segment may be found by multiplying the slope by the X coordinate, the output from the digital to analog ladder network 36 after being amplified by amplifier 40 constitutes the Y-deflection signal for the system.

OPERATION

In operation, digital signals representative of the X-coordinate of the point on a line segment to be formed are entered from the data source 10 into holding registers 16 by way of cable 12. At the same time, digital signals representative of the slope of the line segment to be formed are entered into the slope-holding register 18 by way of cable 14. The digital signals in registers 16 and 18 determine which stages of the digital to analog ladder network 24 and 36 will have a reference voltage or ground applied to them. This is accomplished by means of the bit switches 22 and 34. Appearing on conductor 28 and amplified by amplifier 30 will be an analog signal proportional to the digital number initially entered into the holding register 16. This amplified signal which appears on output line 32 is connected to the X-deflection electrodes of the cathode ray tube. Further, the output signal from the amplifier 30 is connected by way of conductor 38 to the reference terminal of the bit switches 34. Hence, depending upon which stages of the slope register 18 are set, either ground or the X-deflection signal will be applied to the various stages of the digital to analog ladder network 36. The output signal from the digital to analog ladder 36 which is amplified by element 40 is proportional to the product of the slope and the X-coordinate of a point on the line segment to be formed and, by definition, constitutes the Y-deflection signal. When both the X and Y deflection signals are applied to a cathode-ray tube and the beam is unblanked, the electron beam will move from an originating point to a point determined by the X and Y deflection signals.

The embodiment illustrated in FIG. 1 is limited in capability to drawing vectors where the angle of the line segment is less than 45° ($s$ less than or equal to 1). In order to permit vector drawing where the slope is greater than 45° ($s$ greater than 1) additional circuitry is required.

DESCRIPTION OF THE PREFERRED EMBODIMENT -FIG. 2

Figure 2:
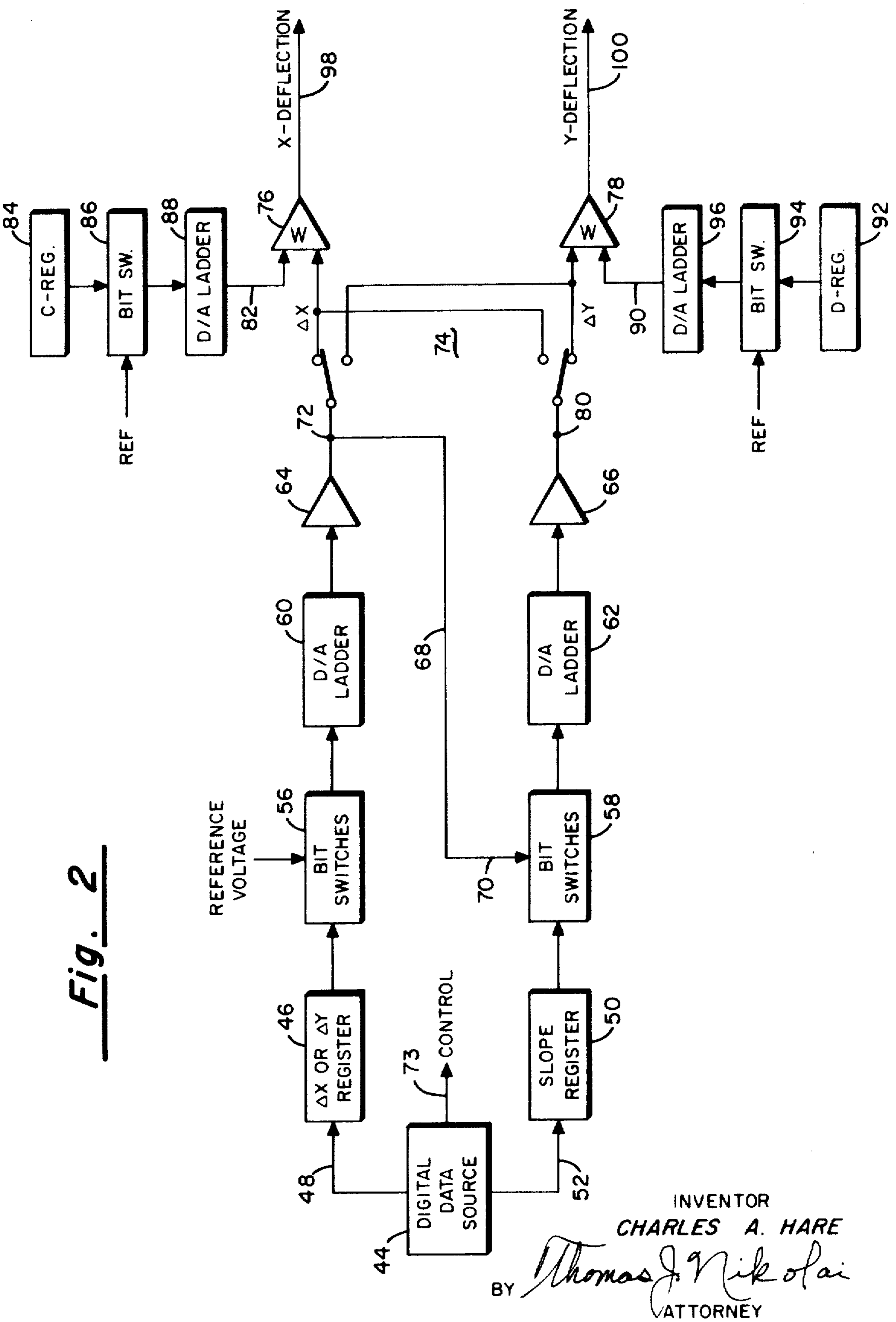
FIG. 2 is a block diagram of the preferred embodiment of the invention which permits the formation of vectors on the face of a cathode-ray tube where the slope of the vector may be less than, equal to or greater than 1.

FIG. 2 illustrates by means of a block diagram a vector generator configuration which will permit vectors having a slope less than, equal to, or greater than 1 to be traced on the face of the cathode-ray tube. As in the embodiment of FIG. 1, digital information indicative of the X or the Y component of a line segment to be formed and the slope of the line segment are obtained from a digital data source 44. Source 44 may be a digital computer, a magnetic tape unit or a keyboard entry device. The signals representative of the X or the Y component of the vector to be drawn are entered into a holding register 46 by way of cable 48. Similarly, the digital signals representative of the slope of the line segments to be formed are entered into the slope-holding register 50 by way of a cable 52. The respective stages of the holding registers 46 and 50 are coupled through bit switches 58 and 56 to corresponding stages of digital-to-analog converter ladder networks 60 ad 62. The bit switches 56 serve to connect either ground potential or a predetermined reference voltage to a given terminals of the ladder network 60, depending upon the binary value of the content of the associated stage in the register 46. The analog output signals from the ladder networks 60 and 62 are amplified in operational amplifiers 64 and 66. The output of operational amplifier 64 is coupled by way of a conductor 68 to the reference voltage terminal 70 of the bit switching network 58.

The amplified output signal from operational amplifier 64 which appears at junction 72 is coupled through a reversing-type switch indicated generally by numeral 74 to either a summing amplifier 76 or a summing amplifier 78. In a similar fashion, the output from operational amplifiers 66 appearing at output terminal 80 is coupled through the reversing switch 74 to either the summing amplifier 78 or the summing amplifier 76. While the reversing switch 74 is illustrated as a mechanical arrangement of a double-pole, double-throw switch, in practice, the switch 74 is solid state electronic switch, many forms of which are well known in the art. Such an electronic switch receives a toggling-control pulse and causes a reversal of the signals applied to the summing amplifiers 76 ad 78.

Coupled to a second input terminal 82 of summing amplifier 76 is a combination of a holding register 84 denoted the C-register, a bit-switching network 86 and a digital-to-analog converter ladder network 88. Similarly, connected to the second input terminal 90 of summing amplifier 78 is the combination of a digital-holding register 92 denoted the D-register, a bit-switching network 94 and a digital-to-analog converter ladder network 96. The reference voltage applied to the reference inputs for bit switches 86 and 94 is the same as that applied to the bit switches 56. The registers 84 and 92 are adapted to receive binary numbers from the digital data source 44 representative of the X and Y coordinate location of the point from which the vector to be displayed is to be drawn.

The output lines 98 and 100 from the summing amplifiers 76 and 78 are connected to the deflection circuits of the cathode ray tube with which the vector generator of this invention is utilized.

Now that the construction of the circuit of FIG. 2 has been described, consideration will now be given to its operation.

OPERATION—FIG. 2

Figure 3:
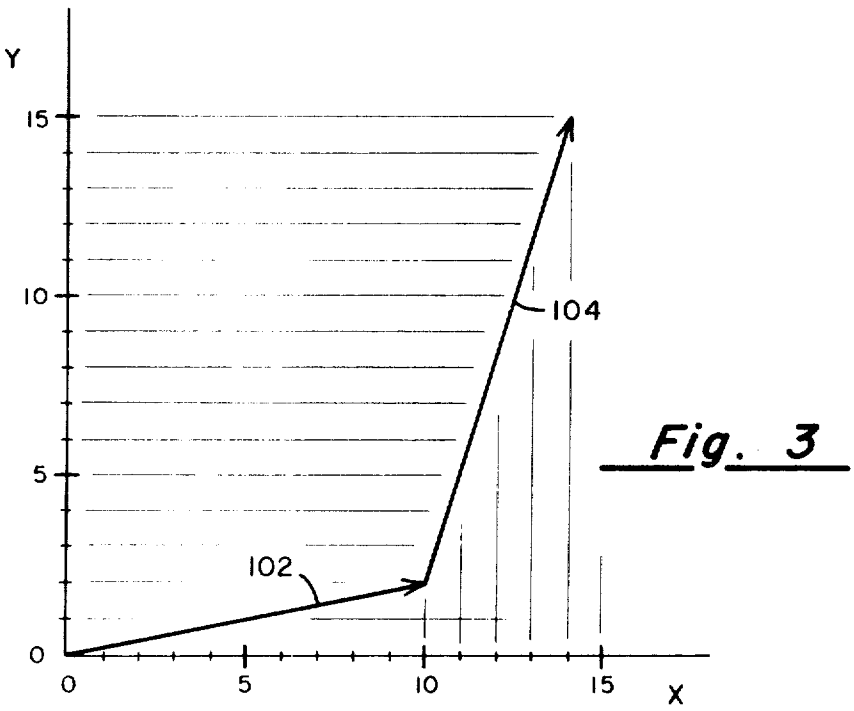
FIG. 3 is a vector diagram used in explaining the operation of the circuit of FIG. 2.

Referring to FIG. 3, assume it is desired to paint the vectors illustrated therein on the face of a cathode ray tube. It is immediately apparent from FIG. 3, that the vector 102 has a slope less than 1 whereas vector 104 has a slope greater than 1. In forming the requisite deflection signals for the cathode ray tube to trace out vector 102, the digital data source 44 loads the register 46 with a binary number corresponding to the length of the X component of the vector 102 (10 decimal). The slope register 50 is loaded with a binary number representing the slope of the vector 102. In the example being considered the slope of vector 102 is 0.2 (decimal). Because the vector 102 starts at the origin, the digital values contained in the C-register 84 and the D-register 92 are all 0's.

Because the slope of the vector 102 is less than 1, no control signal is developed on line 73 and the switching device 74 is not toggled or reversed from the condition illustrated in FIG. 2. With the register 46 loaded with the binary number 1010(decimal 10) the bit switches 56 will serve to connect a fixed reference voltage to the second and fourth stages of the digital to analog ladder network 60. The bit switches associated with stages 1 and 3 of the register 46 will cause ground potential to be applied to corresponding stages of the ladder network 60. As a result, a DC voltage will be developed at the output of the ladder network 60 and applied through operational amplifier 64 to the output terminal 72. This output signal is coupled back by way of conductor 68 to the reference input terminal 70 of the bit switches 58. With a binary number stored in the slope register 50 representative of the value 0.2 (decimal) selected stages of the digital to analog ladder network 62 will have the output from the amplifier 64 coupled to it. Other stages of the ladder 62 will be connected by the bit switches 58 to ground.

Appearing at the output of the digital to analog converter ladder network 62, then, will be a DC voltage which is proportional to the product of the slope of the line segment to be formed and the X component of this vector. This signal is amplified in operational amplifier 66 and applied as a first input to the summing amplifier 78. Because, as was mentioned earlier, registers 84 and 92 are cleared, summing amplifier 76 will produce a direct current output on line 98 which is proportional to the length of the X component of the vector to be formed. Similarly, the summing amplifier 78 will produce a direct current voltage on its output line 100 which is proportional to the product of the slope of the vector to be formed and the X component of this vector. By observing the formula $y=sx+b$, it is immediately apparent that the signal appearing on line 100 is proportional to the Y component of the vector to be formed. When the voltages on line 98 and 100 are connected to the X and Y deflection amplifiers and the beam of the deflection amplifier is unblanked, the electron beam will move from the origin 0,0 to a point corresponding to a value $X$=10$Y$=2.

Next to be considered is the generation of a vector having a slope greater than 1. It is to be assumed that the vector 104 is to be formed on the face of a cathode-ray tube. In forming a vector having a slope greater than 1, the apparatus of this invention implements the equation $$X=\frac{\Delta x}{\Delta y}\cdot y+b,$$

whereas when the slope is less than one, the equation $$y=\frac{\Delta y}{\Delta x}\cdot x+b$$

is implemented.

The digital data source 44 first loads the C-register 84 with the X coordinate of the origin of the vector to be formed. In the assumed example, this value would be the decimal 10. Similarly, the data source 44 loads the D-register 92 with a binary value corresponding to the Y coordinates of the origin of the vector to be formed (2 in this example). The digital data source 34 compares the X and Y components of the vector 104 and determines that the Y component is greater than the X component (13 is greater than 4). As a result, the register 46 is loaded with a binary number corresponding to the Y component of the vector 104 to be traced. (Had these slopes been less than 1, register 46 would have been loaded with the X component of the vector to be traced.) Because the slope is determined to be greater than 1, the digital data source 44 loads the slope register 50 with the reciprocal of the slope or four-thirteenths in this example. The bit switches 56 and 58 and the ladder networks 60 and 62 operate in the manner previously described to cause direct current voltages proportional to the digital values contained in the registers 46 and 50 to appear at the output terminals 72 and 80. Because the slope is greater than 1, the digital data source 44 produces a toggle which operates on the switching network 74 to reverse the connection to the summing amplifiers 76 and 78. As such the signal appearing at the output terminal 72 is applied to a first input terminal of summing amplifier 78 whereas the output signal appearing at terminal 80 is coupled through the switching network to a first input terminal of the summing network 76.

Added to the voltage applied to the first input terminal of summing amplifier 78 is a direct current voltage proportional to the Y coordinate of the origin of the vector 104. The total voltage appearing on the output line 98 is proportional to the product of the slope and the Y component of the vector to be traced while the voltage appearing on the output line 100 is proportional to the Y component of the vector to be traced. The effect of the voltages appearing on lines 82 and 90 is to translate the vector to be traced from the 0, 0 origin to the location X =10Y =2. Therefore, when the beam is unblanked, the voltages appearing on lines 98 and 100 will cause the electron beam to move from the coordinate location X =10=Y =2 to the coordinate location X=14Y =15.

As mentioned previously, the various components used in implementing the systems of FIG. 1 and 2 are completely conventional. The bit switches used in FIGS. 1 and 2 are merely solid state bipolar switches which are responsive to the digital value contained in a register stage for either connecting a reference voltage or ground to a terminal of the digital to analog converter. The summing amplifiers 76 and 78 used in the embodiment of FIG. 2 are standard commercially available items.

The implementation of the vector generators of FIGS. 1 and 2 does not require that the applied signals be linear in time. All that is required is that the applied signals have a frequency content within the bandwidth capabilities of the circuits employed.

It is also believed that it is well within the realm of ordinary skill in the art to program a digital computer or other source of digital data so as to provide a readout of digital signals representing the X or the Y component of a vector to be displayed as well as the slope of the vector. Further, it should be readily apparent to those skilled in the art as to how the digital data source 44 in FIG. 2 can produce a control signal on line 73 whenever the ratio of the Y component to the X component of a vector to be formed is greater than 1. It is this signal that is used to control the switching network 74.

While the principles of the invention have now been made clear in an illustrative embodiment, there will be immediately obvious to those skilled in the art, many modifications of structure, arrangement, proportions, the elements, materials and components used in the practice of the invention, and otherwise, which are particularly adapted for specific environments and operation requirements, without departing from these principles. The appended claims are therefore intended to cover and embrace any such modification, within the limits only of the true spirit and scope of the invention.

What is claimed is:

1. In a cathode ray tube display system a vector generator comprising
   a. first and second registers for respectively storing digital signals representing a coordinate of a point on a line segment to be traced on said cathode ray tube and the slope of said line segment;
   b. first and second digital to analog converter means
   c. switching means coupled to the output of said first and second registers for selectively applying a first or a second voltage to predetermined stages of said first and second digital to analog converters.
   d. the first and second deflection amplifier means coupled respectively to the output from said first and second digital to analog converters; and
   e. means coupling the output of said first deflection amplifier to said switching means for providing said first voltage to said second digital to analog converter.

2. A system for generating vectors on the face of a cathode-ray tube comprising
   a. first and second registers for respectively storing digital signals representing an incremental change in the coordinate of a point on a line segment to be traced on said cathode-ray tube and the slope of said line segment;
   b. first and second digital to analog converter means;
   c. switching means coupled to the output of said first and second registers for selectively applying a first or a second voltage to predetermined stages of said first and second digital to analog converters;
   d. first and second amplifier means coupled respectively to the output from said first and second digital to analog converters;
   e. means coupling the output of said first amplifier to said switching means for providing said first voltage to said second digital to analog converter.
   f. third and fourth registers for storing the $x$ and $y$ coordinates of the initial position of said line segment;
   g. first and second summing amplifiers having a pair of input terminals an an output terminal;
   h. third and fourth digital to analog converter means respectively coupling said third and fourth registers to said first terminal of said first and second summing amplifiers; and double pole-double throw switch means for coupling the output of said first and second amplifiers respectively to said second input terminal of said first and second summing amplifiers when said switch means is in a first condition and to the second input terminal of said second and first summing amplifier when said switch means is in a second condition.

* * * * *